US008452057B2

(12) United States Patent
Chen et al.

(10) Patent No.: US 8,452,057 B2
(45) Date of Patent: May 28, 2013

(54) PROJECTOR AND PROJECTION CONTROL METHOD

(75) Inventors: Chien-Lin Chen, Taipei Hsien (TW); Shao-Wen Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 222 days.

(21) Appl. No.: 12/899,538

(22) Filed: Oct. 6, 2010

(65) Prior Publication Data

US 2011/0280441 A1 Nov. 17, 2011

(30) Foreign Application Priority Data

May 17, 2010 (TW) ............................... 99115626 A

(51) Int. Cl.
*G06K 9/00* (2006.01)
(52) U.S. Cl.
USPC .......................................................... 382/114
(58) Field of Classification Search
None
See application file for complete search history.

(56) References Cited

U.S. PATENT DOCUMENTS

| 8,180,114 B2 * | 5/2012 | Nishihara et al. | ............. | 382/114 |
| 2009/0103780 A1 * | 4/2009 | Nishihara et al. | ............. | 382/103 |

OTHER PUBLICATIONS

Hojoon Park, "A Method for Controlling the MouseMovement using a Real Time Camera", 2008, Brown University,Providence ,RI ,USA, Department of computer science.*
Norifumi Machida, Tetsuji Kobayashi: Hand Gestures Expressing Numbers and Its Application to Personal Identification. MVA 2005: 294-297. 5.*
Hojoon Park, "A Method for Controlling the Mouse Movement using a Real-Time Camera", 2008, Brown University, Providence, RI, USA, Department of Computer Science.*
Norifumi Machida, Tetsuji Kobayashi: Hand Gestures Expressing Numbers and Its Application to Personal Identification. MVA 2005:294-297.5.*
Hoojon Park, "A Method for Controllnig the Mouse Movement using a Real-Time Camera", 2008, Brown University, Providence, RI, USA, Department of Computer Science.*
Norifuma, Machida, Tetsuji Kobayashi: Hand Gestures Expressing Numbers and Its Application to Personal Identification, MVA 2005:294-297.5.*

* cited by examiner

*Primary Examiner* — Stephen R Koziol
*Assistant Examiner* — Delomia Gilliard
(74) *Attorney, Agent, or Firm* — Altis Law Group, Inc.

(57) ABSTRACT

A method controls a projection of a projector. The method predetermines hand gestures, and assigns an operation function of an input device to each of the predetermined hand gestures. When an electronic file is projected onto a screen, the projector receives an image of a speaker captured by an image-capturing device connected to the projector. The projector identifies whether a hand gesture of the speaker matches one of the predetermined hand gestures. If the hand gesture matches one of the hand gestures, the projector may execute a corresponding assigned operation function.

12 Claims, 9 Drawing Sheets

| Serial number | Hand gestures | Mouse buttons | Operation functions |
|---|---|---|---|
| First |  | Mouse wheel | Scrolling in any direction to simulate an "up" and "down" screen function |
| Second |  | Right mouse button | Invoking a contextual menu of an operating system or software program |
| Third |  | Left mouse button | Selecting or interacting with a graphic user interface |

PROJECTOR AND PROJECTION CONTROL METHOD

BACKGROUND

1. Technical Field

Embodiments of the present disclosure generally relate to projectors and projection control methods, and more particularly to a projector and a projection control method using hand gestures.

2. Description of Related Art

Projectors are commonly used indoors to display images or data content in a projection area, such as on a screen or a wall. However, the projectors usually can only be controlled by a user operating an input device, such as a mouse or a keyboard of a computer.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the data "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
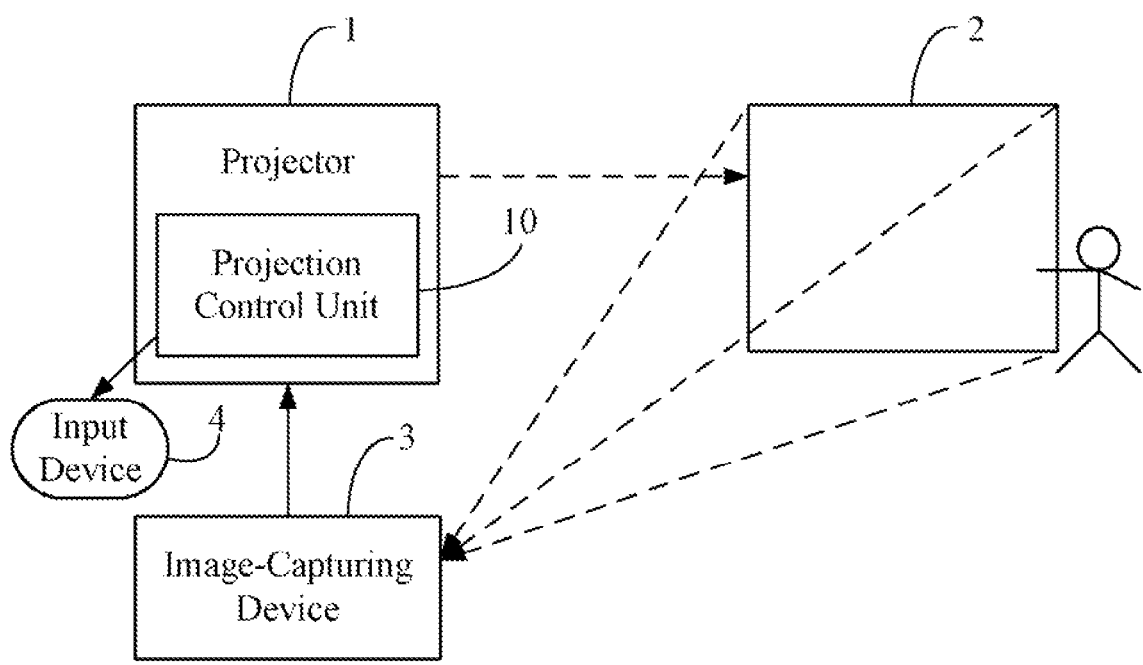
FIG. 1 is a block diagram of one embodiment of a projector, a screen, and an image-capturing device.

FIG. 1 is a schematic diagram of one embodiment of a projector 1 in communication with a screen 2 and an image capturing device 3. In the embodiment, the projector 1 may be a front projector, and includes a projection control unit 10. The projection control unit 10 is programmed to recognize three predetermined hand gestures (or finger gestures) of a person, where each of the hand gestures are associated with an operation function such as might normally be controlled or activated by an input device 4 (i.e., mouse). When an electronic file is projected on the screen 2, the image capturing device 3 captures images of the area around the screen 2 to capture an image of a speaker, if one is present, who may be discussing the electronic file. The projection control unit 10 identifies whether a hand gesture of the speaker matches one of the predetermined hand gestures, and executes the corresponding assigned operation function upon the condition that the hand gesture matches one of the hand gestures.

Figure 2:
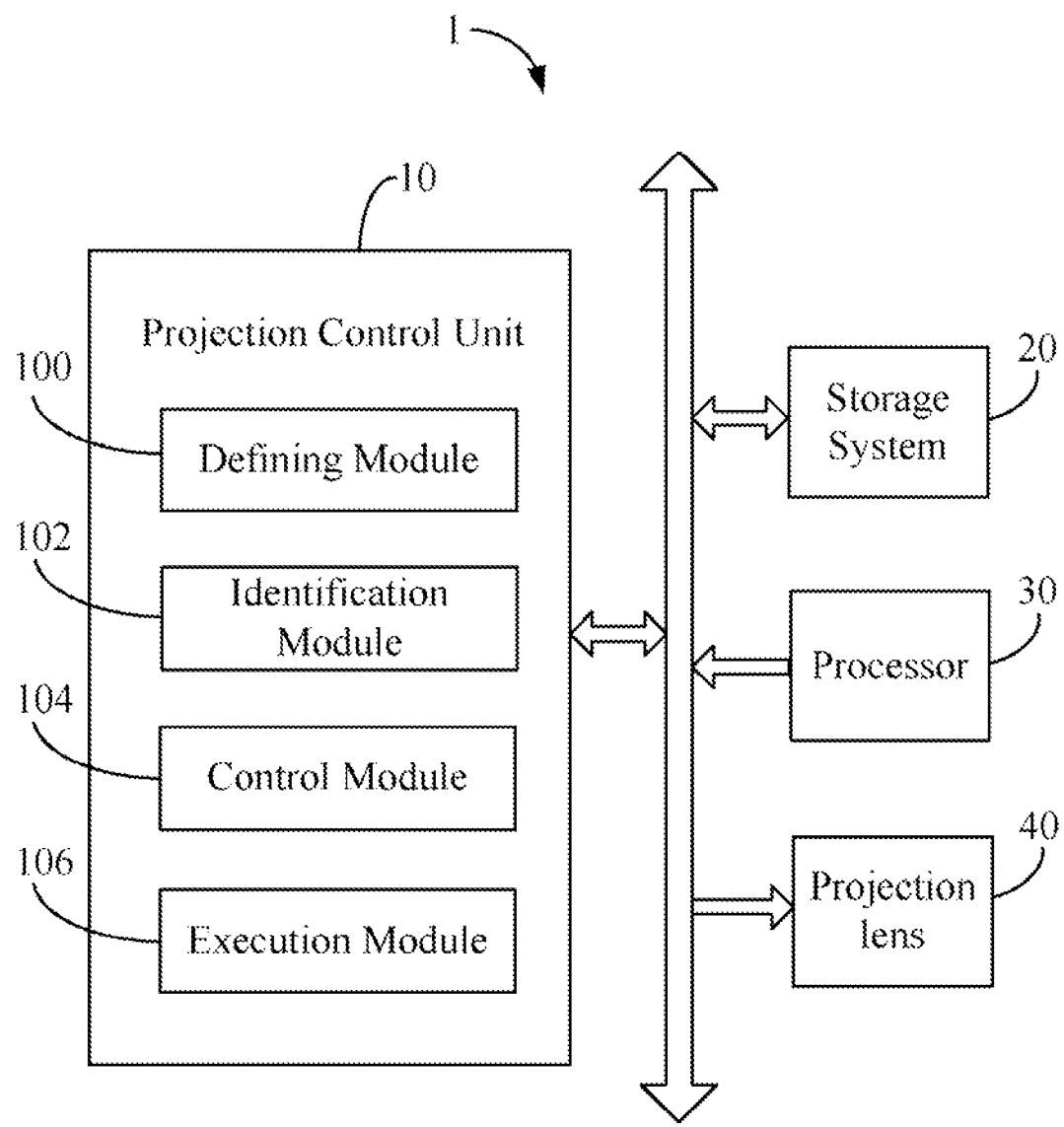
FIG. 2 is a block diagram of one embodiment of function modules of a projection control unit installed in the projector of FIG. 1.

FIG. 2 is a block diagram of one embodiment of function modules of the projection control unit 10. As illustrated in FIG. 2, the projector 1 may further include a storage system 20, at least one processor 30, and a projection lens 40. In one embodiment, the projection control unit 10 includes a defining module 100, an identification module 102, a control module 104, and an execution module 106. Each of the modules 100-106 may be a software program including one or more computerized instructions that are stored in the storage system 20 and executed by the processor 30. The projection lens 40 is configured to project the electronic file onto the screen 2.

In one embodiment, the storage system 20 may be a magnetic or an optical storage system, such as a hard disk drive, an optical drive, or a tape drive. The storage system 20 also stores the three predetermined hand gestures, and the operation function associated with each of the predetermined hand gestures.

The defining module 100 is used for predetermining hand gestures, and assigning an operation function of the input device 4 to each of the hand gestures. In the embodiment, the input device 4 can be a mouse, a keyboard, for example.

For example, the defining module 100 can associate a first hand gesture with execution of an operational function of a scroll wheel, such as scrolling the scroll wheel in any direction, to simulate an "up" and "down" screen function of browsing the electronic file respectively. The defining module 100 can further associate a second hand gesture with execution of an operational function of a right mouse button, such as invoking a contextual menu of an operating system or software program. The defining module 102 can further associate a third hand gesture with execution of an operation function of a left mouse button, such as executing the operation function of selecting or interacting with a graphic user interface of the screen 2.

Figure 3:
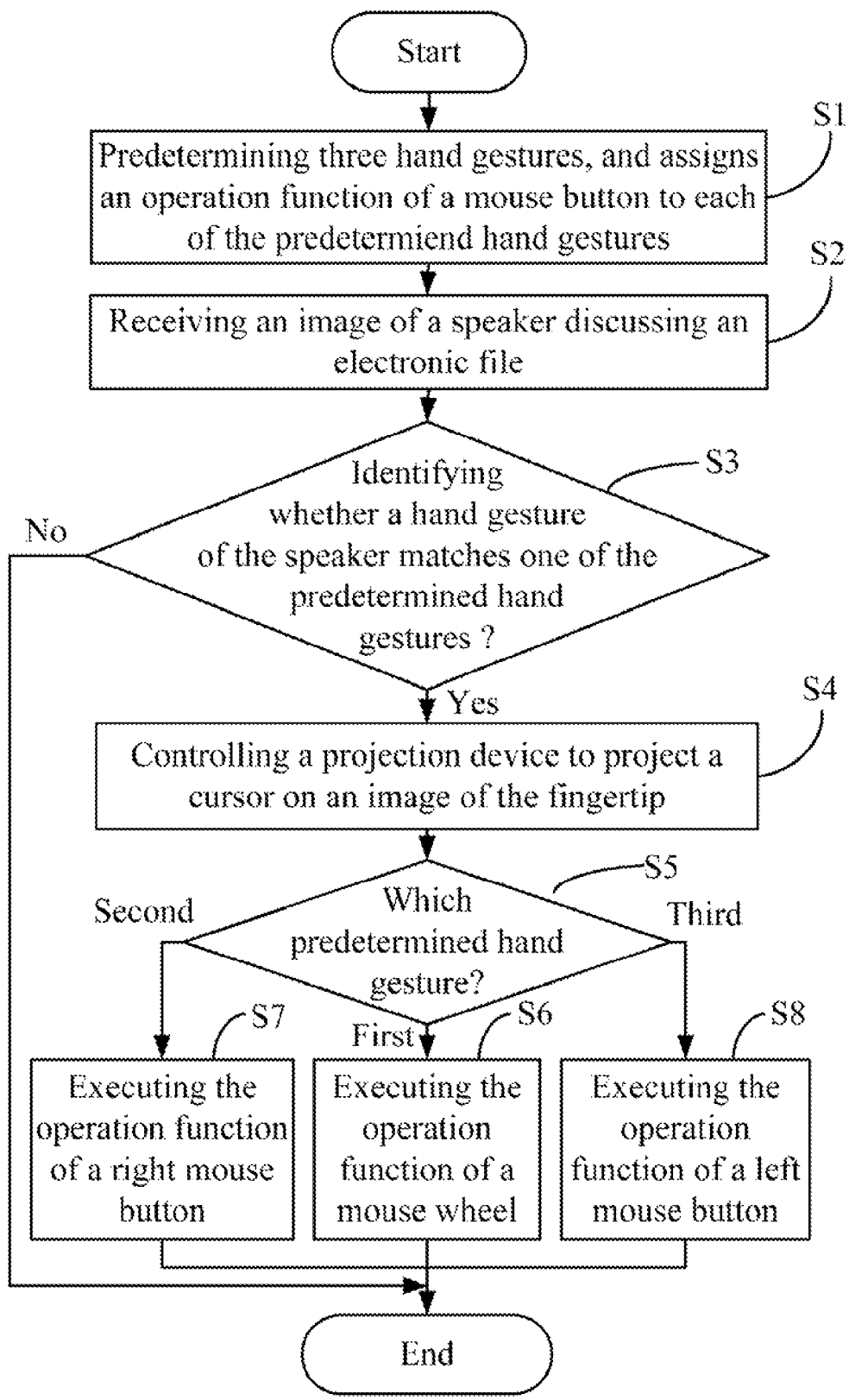
FIG. 3 is a flowchart illustrating one embodiment of a projection control method of the projector of FIG. 1.

As illustrated in FIG. 3, the first hand gesture can be defined as a right hand of a person held with only the forefinger extended. The second hand gesture is a right hand of a person held with all fingers extended and the thumb curled in. The third hand gesture is a right hand of a person held with only the thumb and forefinger extended forming an L-shape and remaining fingers curled in. Each of the hand gestures is the same as three signs used in American sign language for the numbers one and four, and the letter L, respectively.

When the electronic file is projected onto the screen 2, the image-capturing device 3 captures an image of the area around the screen 2 to capture an image of a speaker discussing the electronic file. The identification module 102 receives the image, identifies whether a hand gesture of the speaker is in the image. The identification module 102 further identifies whether the hand gesture of the speaker matches one of the hand gestures stored in the storage system 20, under the condition that a hand gesture of the speaker is in the image.

Figure 6:
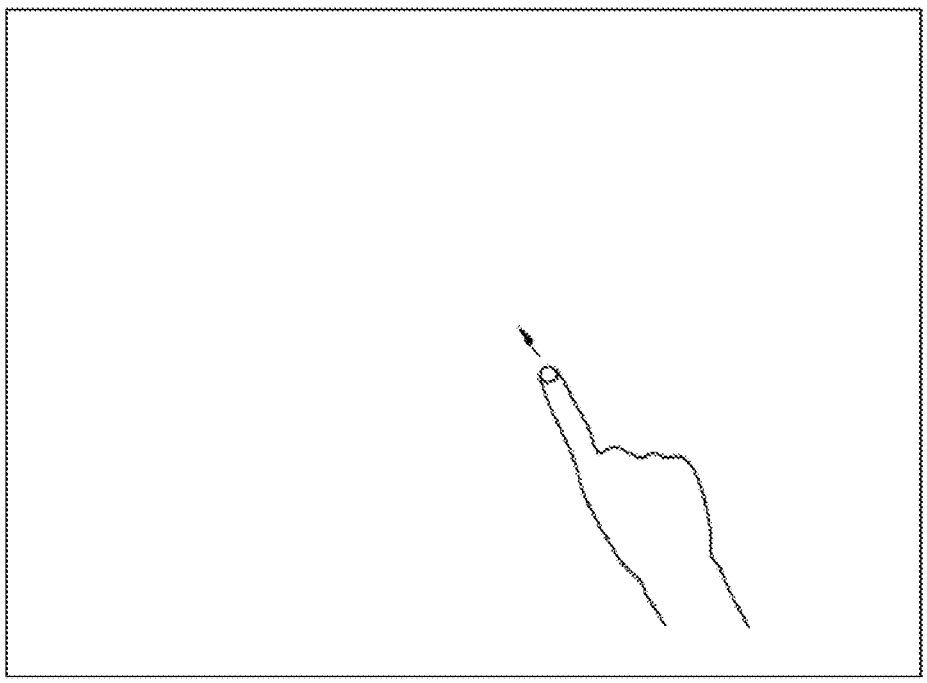

If the hand gesture of the speaker matches one of the hand gestures, the controlling module 104 controls the projection lens 40 to project a cursor onto the screen 2. In one embodiment, the cursor is in the vicinity of an image of the hand gesture. Before controlling the projection lens 40 to project the cursor onto the screen 2, the controlling module 104 further searches a fingertip of one finger of the hand gesture (i.e., the fingertip of the forefinger), and controls the projection lens 40 to project the cursor on the image of the fingertip. As shown in FIG. 6, a rhombic icon is projected on the image of the forefinger, and the rhombic icon is one type of the cursor. In one embodiment, a type of the cursor can be predetermined according to user's requirement.

The execution module 106 executes a corresponding operation function of the mouse button assigned to the matched hand gesture. For example, if the identification module 102 identifies that the hand gesture of the speaker matches the second hand gesture, the execution module 106 executes the operation function of the right mouse button to invoke a contextual menu.

FIG. 3 is a flowchart illustrating one embodiment of a projection control method of the projector 1 of FIG. 1. Depending on the embodiment, additional blocks may be added, others removed, and the ordering of the blocks may be changed.

Figure 4:
FIG. 4 is an example illustrating three hand gestures and operation functions assigned to the hand gestures.
Figure 4:
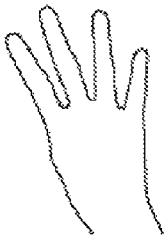
Figure 4:
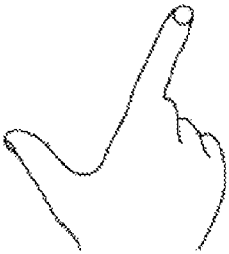
Figure 5:
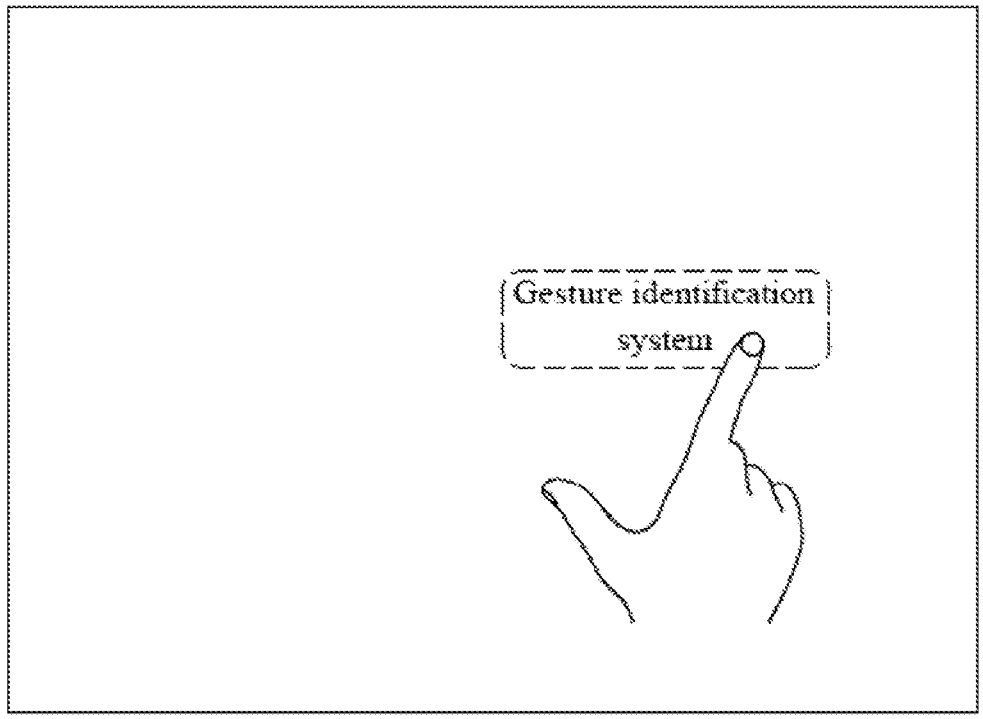
FIG. 5 to FIG. 9 are schematic diagrams illustrating the operation functions assigned to the three hand gestures in FIG. 4.

In block S1, the defining module 100 predetermines three hand gestures, and assigns an operation function of a mouse button to each of the hand gestures. FIG. 4 gives an example illustrating three hand gestures and operation functions assigned to the hand gestures. In FIG. 4, the hand gestures include a first hand gesture associated with execution of an operation function of a scroll wheel, a second hand gesture associated with execution of an operation function of a right mouse button, and a third hand gesture associated with execution of an operation function of a left mouse button. In the embodiment, the operation functions assigned to the three hand gestures are saved in the storage system 20.

When an electronic file is projected onto the screen 2, in block S2, the image capturing device 3 captures an image of the area around the screen 2 to capture an image of a speaker discussing the electronic file, and the identification module 102 receives the image.

In block S3, the identification module 102 identifies whether a hand gesture of the speaker is in the image. If the hand gesture of the speaker is in the image, the identification module 102 identifies whether the hand gesture of the speaker matches one of the hand gestures saved in the storage system 20. If the hand gesture of the speaker matches one of the hand gestures, the flow goes to block S4. If the hand gesture of the speaker does not match one of the hand gestures, the flow ends.

In block S4, the control module 104 controls the projection lens 40 to project a cursor onto the screen 2. In one embodiment, the cursor is in the vicinity of an image of the hand gesture.

In block S5, the identification module 102 identifies which predetermined hand gesture is matched by the hand gesture of the speaker. If the first hand gesture is matched by the hand gesture, the flow goes to block S6. If the second hand gesture is matched by the hand gesture, the flow goes to block S7. If the third hand gesture is matched by the hand gesture, the flow goes to block S8.

In block S6, the executing module 106 executes the operation function of the scroll wheel, such as scrolling the scroll wheel in any direction, to simulate an "up" and "down" screen function of browsing the electronic file respectively.

Figure 8:
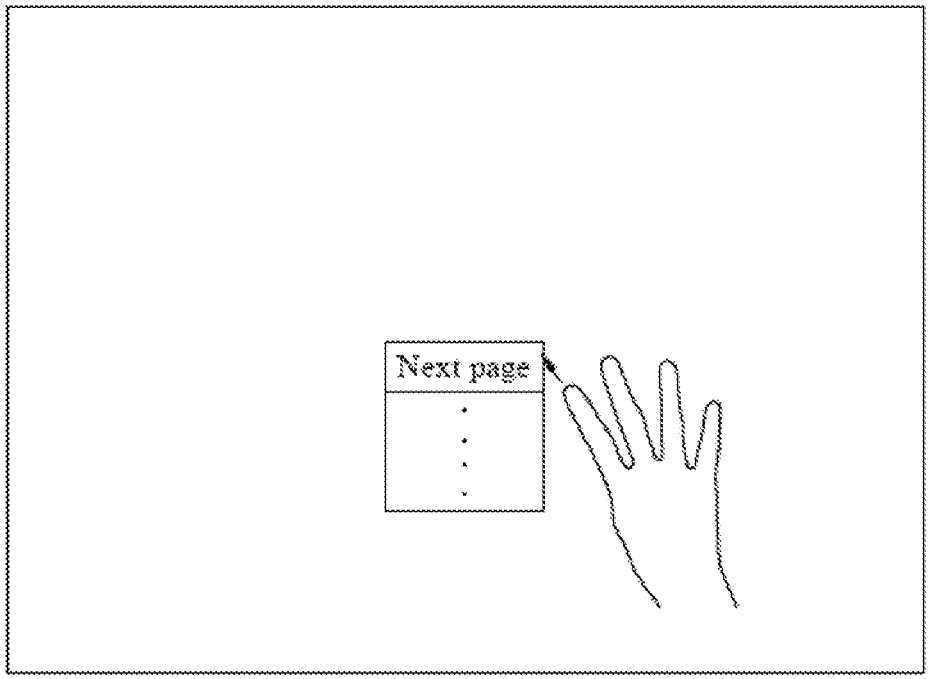

In block S7, the executing module 106 executes the operation function of the right mouse button, as shown in FIG. 8, the executing module 106 invokes a contextual menu of an operating system or software program.

Figure 9:
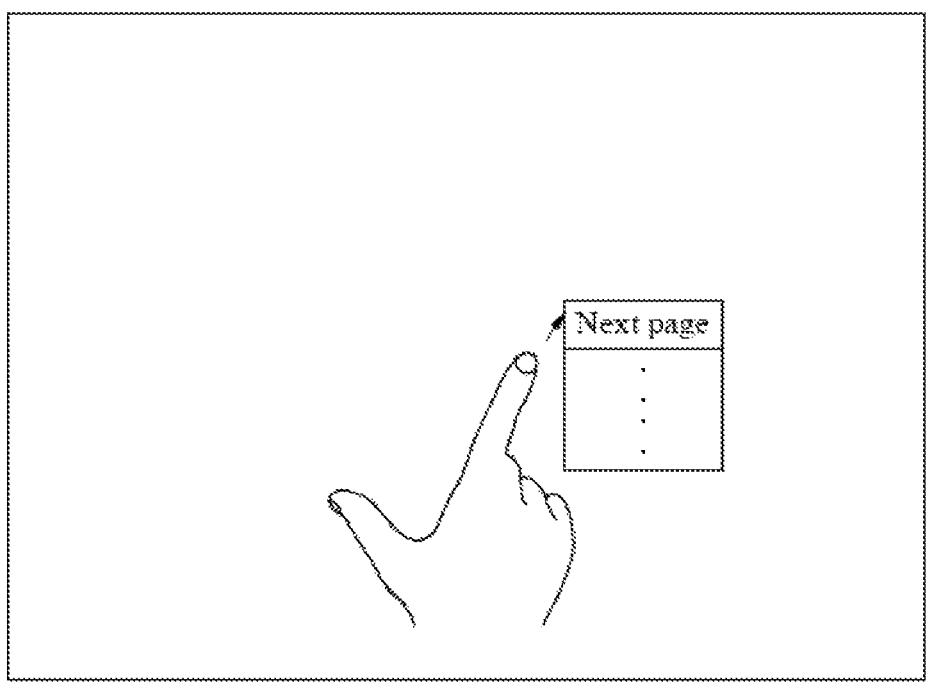

In block S8, the executing module 106 executes the operation function of the left mouse button, as shown in FIG. 9, the executing module 106 selects a tag of "next page" to switch the display image to the next page of image.

Figure 7:
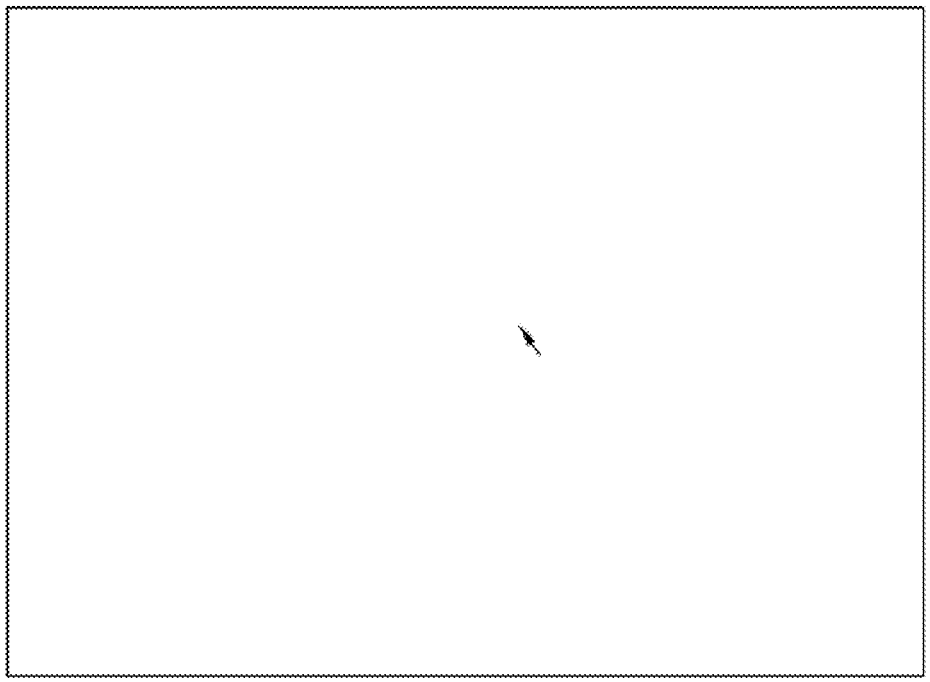

As shown in FIG. 7, the control module 104 can control the cursor in the same position when hands of the speaker is left from the front of the screen 2. The control module 104 also can control the cursor in the same position when the speaker moves his/her hands.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A projection control method for a projector connected to an image capturing device, the method comprising:
   predetermining hand gestures, assigning an operation function of an input device to each of the predetermined hand gestures, the hand gestures comprising a first hand gesture associated with execution of an operation function of a scroll wheel of a mouse, a second hand gesture associated with execution of an operation function of a right mouse button of the mouse, and a third hand gesture associated with execution of an operation function of a left mouse button of the mouse;
   receiving an image of a speaker captured by the image capturing device when an electronic file is projected onto a screen by the projector;
   identifying whether a hand gesture of the speaker matches one of the predetermined hand gestures;
   searching a fingertip of one finger of the hand gesture, and projecting a cursor on an image of the fingertip, the cursor being controlled in the same position when a hand of the speaker leaves from the front of the screen, and the cursor being controlled in the same position when the hand of the speaker is moved; and
   upon the condition that the hand gesture matches one of the predetermined hand gestures, executing a corresponding assigned operation function.

2. The method as described in claim 1, wherein the first hand gesture represents a number one.

3. The method as described in claim 1, wherein the second hand gesture represents a number four.

4. The method as described in claim 1, wherein the third hand gesture represents a letter L.

5. The method as described in claim 1, further comprising:
   determining whether the hand gesture of the speaker exists in the image;
   identifying whether the hand gesture of the speaker matches one of the predetermined hand gestures when the hand gesture is in the image.

6. A projector connected to an image-capturing device, the projector comprising:
   at least one processor;
   a storage system; and
   a projection control unit stored in the storage system and executed by the at least one processor, the projection control unit comprising:
   a defining module operable to predetermine hand gestures, and assign an operation function of an input device to each of the predetermined hand gestures, the hand gestures comprising a first hand gesture associated with execution of an operation function of a scroll wheel of a mouse, a second hand gesture associated with execution of an operation function of a right mouse button of the mouse, and a third hand gesture associated with execution of an operation function of a left mouse button of the mouse;
   an identification module operable to receive an image of a speaker captured by the image-capturing device when an electronic file is projected onto a screen by the projector, and identify whether a hand gesture of the speaker matches one of the predetermined hand gestures;

a control module operable to search a fingertip of one finger of the hand gesture, and control the projector to project a cursor on an image of the fingertip;

the control module further operable to control the cursor in the same position when a hand of the speaker leaves from the front of the screen, and control the cursor in the same position when the hand of the speaker is moved; and an execution module operable to execute the corresponding operation function of the input device according to the matched hand gesture.

7. The projector as described in claim 6, wherein the first hand gesture represents a number one.

8. The projector as described in claim 6, wherein the second hand gesture represents a number four.

9. The projector as described in claim 6, wherein the third hand gesture represents a letter L.

10. The projector as described in claim 6, wherein the identification module is further operable to determine whether the hand gesture of the speaker exists in the image.

11. A non-transitory storage medium having stored thereon instructions that, when executed by a processor of a projector, cause the projector to perform a projection control method, the method comprising:

predetermining hand gestures, assigning an operation function of an input device to each of the predetermined hand gestures, the hand gestures comprising a first hand gesture associated with execution of an operation function of a scroll wheel of a mouse, a second hand gesture associated with execution of an operation function of a right mouse button of the mouse, and a third hand gesture associated with execution of an operation function of a left mouse button of the mouse;

receiving an image of a speaker captured by the image capturing device when an electronic file is projected onto a screen by the projector;

identifying whether a hand gesture of the speaker matches one of the predetermined hand gestures;

searching a fingertip of one finger of the hand gesture, and projecting a cursor on an image of the fingertip, the cursor being controlled in the same position when a hand of the speaker leaves from the front of the screen, and the cursor being controlled in the same position when the hand of the speaker are moved; and upon the condition that the hand gesture matches one of the predetermined hand gestures, executing a corresponding assigned operation function.

12. The storage medium as described in claim 11, wherein the first hand gesture represents a number one, the second hand gesture represents a number four, and the third hand gesture represents a letter L.

\* \* \* \* \*